(12) United States Patent
Jackson et al.

(10) Patent No.: US 6,428,910 B1
(45) Date of Patent: Aug. 6, 2002

(54) NB-BASED SILICIDE COMPOSITE COMPOSITIONS

(75) Inventors: Melvin Robert Jackson, Niskayuna; Bernard Patrick Bewlay, Schenectady; Ji-Cheng Zhao; Reed Roeder Corderman, both of Niskayuna, all of NY (US)

(73) Assignee: General Electric Company, Niskayuna, NY (US)

( * ) Notice: Subject to any disclaimer, the term of this patent is extended or adjusted under 35 U.S.C. 154(b) by 49 days.

(21) Appl. No.: 09/651,969

(22) Filed: Aug. 31, 2000

(51) Int. Cl.$^7$ .......................... B32B 15/01; C22C 27/02
(52) U.S. Cl. ...................... 428/660; 148/422; 148/442; 148/902; 420/425; 420/426; 420/580; 428/610; 428/636; 428/662
(58) Field of Search ................................. 428/660, 662, 428/636, 610; 420/425, 426, 580; 148/422, 442, 902

(56) References Cited

U.S. PATENT DOCUMENTS

| | | |
|---|---|---|
| 5,393,487 A | 2/1995 | Matway et al. ............... 420/43 |
| 5,741,376 A | 4/1998 | Subramanian et al. ...... 148/422 |
| 5,833,773 A | 11/1998 | Bewlay et al. ............. 148/422 |
| 5,932,003 A | 8/1999 | Jackson et al. ............. 148/422 |
| 5,942,055 A | 8/1999 | Jackson et al. ............. 148/422 |

OTHER PUBLICATIONS

M. R. Jackson, et al, High–Temperature Refractory Metal–Intermetallic Composites, *Journal of Metals*, Jan., 1996.

B. P. Bewlay, et al., Refractory Metal–Intermetallic In–Situ Composites for Aircraft Engines, Reprinted from *JOM*, vol. 49, No. 8, Aug., 1997, pp. 44–45; p. 67.

B. P. Bewlay, et al., Evidence for the Existence of $Hf_5Si_3$, *Journal of Phase Equilibria*, vol. 20, No. 2, 1999.

B. P. Bewlay, et al., Processing High–Temperature Refractory–Metal Silicide In–Situ Composites, Reprinted from *JOM*, vol. 51, No. 4, Apr., 1999, pp. 32–36.

P. R. Subramanian, et al., Compressive Creep Behavior of $Nb_5Si_3$, *Scripta Metallurgica et Materialia*, vol. 32, No. 8, pp. 1227–1232, 1995.

B. P. Bewlay, et al., The Nb–Ti–Si Ternary Phase Diagram: Evaluation of Liquid–Solid Phase Equilibria in Nb– and Ti–Rich Alloys, *Journal of Phase Equilibria*, vol. 18, No. 3, 1997.

B. P. Bewlay, et al, The Nb–Hf–Si Ternary phase Diagram: Liquid–Solid Phase Equilibria in Nb–0 and Hf–rich Alloys, *z. Metallkd*, 90, 1999.

B. P. Bewlay, et al., The Nb–Ti–Si Ternary Phase Diagram: Determination of Solid–State Phase Equilibria in Nb– and Ti–Rich Alloys, *Journal of Phase Equilibria*, vol. 19, No. 6, 1998.

*Primary Examiner*—Robert R. Koehler
(74) *Attorney, Agent, or Firm*—Robert P. Santandrea; Noreen C. Johnson

(57) ABSTRACT

A refractory metal intermetallic composition comprising titanium (Ti), hafnium (Hf), silicon (Si), aluminum (Al), chromium (Cr), germanium (Ge), tin (Sn), iron (Fe), and a balance of niobium (Nb) for use in composite structures having applications in turbine components.

34 Claims, 2 Drawing Sheets

NB-BASED SILICIDE COMPOSITE COMPOSITIONS

This invention was made with Government support under Contract No. F33615-98-C-5215 awarded by the Department of Defense—United States Air Force and therefore, the Government has certain rights in the invention.

BACKGROUND OF THE INVENTION

The invention relates to Nb-based silicide composite compositions. In particular, the invention relates to Nb-silicide based composite compositions with chemistries that have applications in turbine components.

Turbines and their components, such as but not limited to aeronautical turbines, land-based, turbines, marine-based turbines, and the like, have typically been manufactured using nickel (Ni)-based materials, which are often referred to as "Ni-based superalloys". Turbine components, when formed from these Ni-based superalloys, exhibit desirable chemical, physical, and mechanical properties and characteristics under high temperature, high stress, and high-pressure conditions generally encountered in turbines during operation. For example, turbine components in modern jet engines, such as an airfoil, can reach temperatures as high as about 1,150° C., which is about 85% of the melting temperatures ($T_m$) of Ni-based superalloys.

While Ni-based superalloys have provided desirable performance, Ni-based superalloy development has been widely explored and significant recent gains have been few in the past 5 years. Efforts have been made to develop alternative turbine component materials. These alternate materials include niobium (Nb)-based refractory metal intermetallic composites (hereinafter "RMIC"). A RMIC may possess higher potential application temperatures if the RMIC can be used at temperatures about 80% or more of their melting temperatures, such as greater than about 1700° C.

A RMIC that comprises at least niobium (Nb), silicon (Si), titanium (Ti), hafnium (Hf), chromium (Cr), and aluminum (Al) (hereinafter "RMIC") has been proposed for turbine component applications. These silicide-based RMICs exhibit a temperature capability that is higher than current Ni-based superalloys. Exemplary silicide-based RMICs are set forth in U.S. Pat. No. 5,932,033, to Jackson and B.P. Bewlay, entitled "Silicide Composite with Nb-Based Metallic Phase and Si-Modified Laves-Type Phase" and U.S. Pat. No. 5,942,055, to Jackson and Bewlay, entitled "Silicide Composite with Nb-Based Metallic Phase and Si-Modified Laves-Type Phase", both of which are assigned to the Assignee of the instant Application and the disclosures of each incorporated fully herein.

Known Nb-silicide based composites, including silicide-based RMIC materials, that exhibit adequate oxidation resistance characteristics for turbine component applications comprise compositions with the following approximate atomic percent ranges: Ti: 20–25, Hf: 1–5, Ta: 0–2, with a concentration ratio value (Nb+Ta):(Ti+Hf) of about 1.4, Si:18–21, Ge: 2–6, B: 2–5, with 22<(Si+Ge+B)<25, Cr: 10–14, Fe: 0–4, with 10<(Cr+Fe)<18, Al:0–4, Sn: 0–3, W: 0–3. Known Nb-silicide based composites, including silicide-based RMIC materials, that exhibit adequate creep-rupture resistance for turbine component applications comprise compositions with the following approximate atomic percent ranges: Ti: 16–20, Hf: 1–5, Ta: 0–7, with a concentration ratio value (Nb+Ta):(Ti+Hf) of about 2.25, Si: 16–19, Ge: 0–6, B: 0–5, with 17<(Si+Ge+B)<21, Cr: 6–10, Fe: 0–4, with 6<(Cr+Fe)<12, Al:0–4, Sn: 0–3, W: 0–3, Mo: 0–3. Further, known Nb-silicide based composites, including silicide-based RMIC materials, that exhibit adequate fracture toughness for turbine component applications comprise greater than or equal to about 30 volume percent of metallic phases.

The above Nb-silicide based composite and silicide-based RMIC materials comprise small overlapping ranges of constituents, in which the overlapping regions are small in size. Thus, a single silicide-based RMIC material composition is not readily available in which the RMIC can provide adequate creep, oxidation and toughness resistance for turbine component applications is very difficult to obtain.

While the oxidation performance and creep-rupture resistance for turbine component applications of known RMICs are desirable, these materials still may be improved for turbine component applications. For example, the chemistries and compositions of the RMIC material may be enhanced to enhance oxidation resistance and creep resistance for applications that subject the turbine component to high stresses at elevated temperatures in a range from about 2000° F. to about 2400° F. over long periods of time.

Therefore, a need exists to provide a material with a composition and chemistry for applications over long periods of time and under high stresses at elevated temperatures. Further, a need exists to provide a RMIC for turbine component applications with enhanced oxidation resistance and creep resistance over long periods of time and under high stresses at elevated temperatures.

SUMMARY OF THE INVENTION

Accordingly, one aspect of the invention provides a refractory metal intermetallic composition comprising, in atomic percent, titanium (Ti) in a range from about 17% to about 23%, hafnium (Hf) in a range from about 1.2% to about 3%, silicon (Si) in a range from about 16% to about 183%, 2% aluminum (Al), chromium (Cr) in a range from>about 6% to about 10%, germanium (Ge) in a range from about 2% to about 4%, 2% tin (Sn), iron (Fe) in a range from about 2% to about 4%, and a balance of niobium (Nb). The refractory metal intermetallic composition may further comprise at least one of boron (B), tantalum (Ta), and tungsten (W). The refractory metal intermetallic composition may contain at least one of 2 atomic percent boron (B), 5 atomic percent tantalum (Ta), and 3 atomic percent tungsten (W).

Another aspect of the invention comprises a turbine component that is formed of a refractory metal intermetallic composition. The refractory metal intermetallic composite comprises, in atomic percent, titanium (Ti) in a range from about 17% to about 23%, hafnium (Hf) in a range from about 1% to about 3%, silicon (Si) in a range from about 16% to about 18%, 2% aluminum (Al), chromium (Cr) in a range from about 6% to about 10%, germanium (Ge) in a range from about 2% to about 4%, 2% tin (Sn), iron (Fe) in a range from about 2% to about 4%, and a balance of niobium (Nb). The refractory metal intermetallic composition may further comprise at least one of boron (B), tantalum (Ta), and, tungsten (W). The refractory metal intermetallic composition may contain at least one of 2 atomic percent boron (B), 5 atomic percent tantalum (Ta), and 3 atomic percent tungsten (W).

A further aspect of the invention sets forth a multi-piece turbine component. The turbine component comprises a core and a surface layer. The turbine component surface layer comprises a refractory metal intermetallic composition comprising, in atomic percent, 23% titanium (Ti), 1.2% hafnium (Hf), 18% silicon (Si), 2% aluminum (Al), 10% chromium (Cr), 4% germanium (Ge), 2% tin (Sn), 4% iron (Fe), 2% boron (B), and a balance of niobium (Nb). The turbine component core comprises a refractory metal intermetallic composition that comprises, in atomic percent, 17% titanium (Ti), 3% hafnium (Hf), 16% silicon (Si), 2% aluminum (Al), 6% chromium (Cr), 2% germanium (Ge), 2% tin (Sn), 2% iron (Fe), 5% tantalum (Ta) and 3% tungsten (W), and a balance of niobium (Nb).

DESCRIPTION OF THE INVENTION

Figure 2:
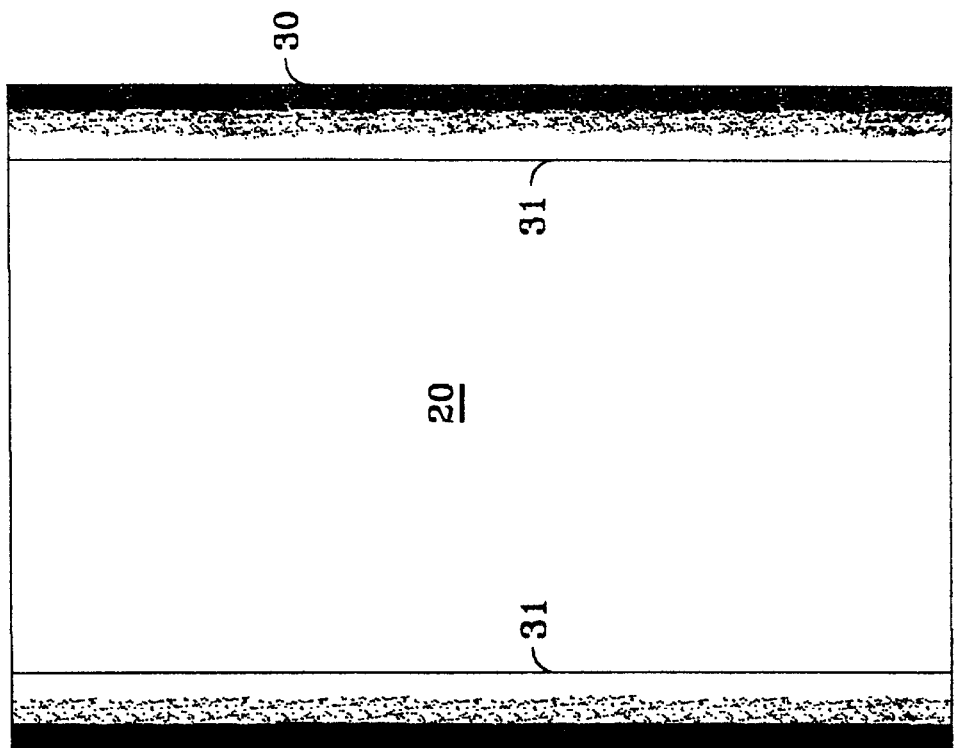
FIG. 2 is a sectional schematic illustration of a turbine component comprising a graded surface layer.

A refractory metal intermetallic composite (RMIC), as embodied by the invention, comprises a Nb-silicide based composite. The Nb-silicide based composite (hereinafter "RMIC") comprises titanium (Ti), hafnium (Hf), silicon (Si), aluminum (Al), chromium (Cr), germanium (Ge), tin (Sn), iron (Fe), and a balance of niobium (Nb). Further, the RMIC may include boron (B), tantalum (Ta), and tungsten (W). The RMIC is provided with these constituents so that a concentration ratio value for (Nb+Ta):(Ti+Hf) in the range from about 1.4 to about 2.25.

The RMIC, as embodied by the invention, exhibits sufficient oxidation resistance and "pesting" resistance to enable applications of the RMIC in a turbine. The term "pesting" relates to oxidation resistance of a material that is dependent on stress and the defect content of the materials, for example particularly at intermediate operation and processing temperatures. For example, the RMIC exhibits sufficient oxidation resistance and pesting resistance for turbine applications, such as, but not limited to, applications in land-based turbines, aeronautical turbines, marine-based turbines, power generation turbines, and the like (hereinafter referred to as "turbine components").

A turbine component may comprise a core and a surface layer thereon. The core of a turbine component should provide enhanced creep resistance and toughness characteristics to withstand the stress, temperatures, and fatigue that a turbine component will be subjected to during operation. The surface layer should provide enhanced oxidation resistance that can withstand oxidation growth conditions that the turbine component is subjected to during operation. A RMIC composition, as embodied by the invention, can be used for both a core and a surface layer of a turbine component by adjusting the constituent amounts therein, and possibly adding one or more constituents.

The RMIC surface and core chemistries can be similar to those in Table 1 below, in which the amounts are approximate and provided in atomic percent, unless expressly indicated otherwise. The surface RMIC composition provides a relatively low (Nb+Ta):(Ti+Hf) concentration ratio value, relatively high Si+Ge+B and Cr+Fe amounts for oxidation resistance, and includes Sn for pesting resistance in turbine component applications. The core RMIC composition provides a relatively high (Nb+Ta):(Ti+Hf) concentration ratio value, low Cr+Fe amounts and added W and Ta for strengthening, and Si+Ge+B at levels suitable for creep resistance in turbine component applications. The term "relatively" is to be interpreted with respect to the amounts in this description and as understood by a person of ordinary skill in the art.

TABLE 1

| Alloy | Ratio | Nb | Ti | Hf | Si | Al | Cr | B | Ta | Ge | Mo | W | Sn | Fe |
|---|---|---|---|---|---|---|---|---|---|---|---|---|---|---|
| surface | 1.4 | 33.8 | 23 | 1.2 | 18 | 2 | 10 | 2 | | 4 | | | 2 | 4 |
| core | 2.25 | 41.4 | 17.6 | 3 | 16 | 2 | 6 | | 5 | 2 | | 3 | 2 | 2 |

Figure 1:
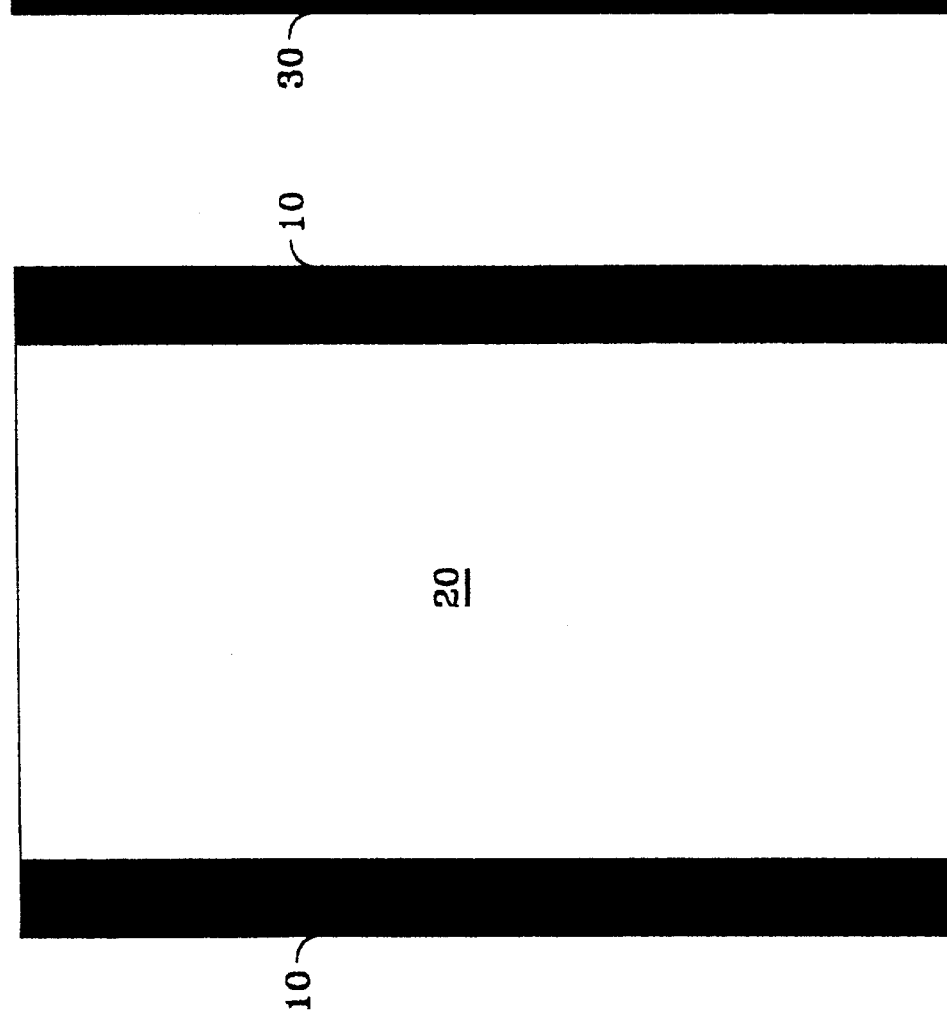
FIG. 1 is a sectional schematic illustration of a turbine component comprising a monolithic surface layer.

A turbine component's surface layer can comprise a monolithic surface layer 10 on a core 20 (FIG. 1). The surface layer 10 can comprise a substantially uniform composition of RMIC, as embodied by the invention. Therefore, the turbine component's surface layer comprises a substantially uniform RMIC composition, and can provide a substantially uniform constituent distribution and material characteristics across the turbine component's surface layer.

Alternatively, the turbine component's surface layer 30 may comprise a graded RMIC chemistry that is on a turbine component core 20 (FIG. 2). The graded RMIC chemistry surface layer 30 may provide a gradation in RMIC constituents across the graded RMIC chemistry surface. Therefore, characteristics in such a graded RMIC chemistry surface will vary from a turbine component core 20 to its surface 31 to satisfy turbine component and turbine system during operation.

A surface RMIC layer could comprise a monolithic RMIC phase mixture. Alternatively, surface RMIC layer could comprise uniform layers that comprise metal, silicide, Laves, and T2 phases. The graded RMIC microstructure can comprise a graded mixture of RMIC phases. Alternatively, the graded RMIC microstructure can comprise a phase-layered structure with at least one graded layer.

For a turbine component with a wall thickness of about 20 mils (about 500 microns), a RMIC surface layer, either a monolithic or graded surface layer, can be about 2 mils (50 microns) thick. This thickness can provide sufficient oxidation =resistance without consuming much of the available surface layer during turbine component operation . The RMIC surface layer thickness may increase slightly as the turbine component wall thickness is increased, however, the RMIC surface layer thickness is not intended to have a thickness greater than about 5 mils (125 microns).

Monolithic RMIC surface layers, as embodied by the invention, can be attached onto a turbine component core surface. The attachment of the monolithic RMIC surface layer can be conducted by deposition processes, for example to form at least one of monolithic and phase-layered RMIC structures, directly on the core. Alternatively, attachment of a graded RMIC surface layer can be conducted by deposition processing, where the RMIC chemistry or phase-layer thicknesses are graded through the deposit. The grading can be linear or exponential through the layer.

A RMIC turbine component core can be produced by at least one of: directionally solidifying stock, extruding or otherwise hot processing stock; heat treating a billet or sheet; powder metallurgy processing; and forming by deposition methods, such as, but not limited to, electron beam evaporated or vacuum ion plasma deposition processes. A RMIC turbine component core may comprise homogeneous chemistry compositions or phase-layered compositions.

Figure 3:
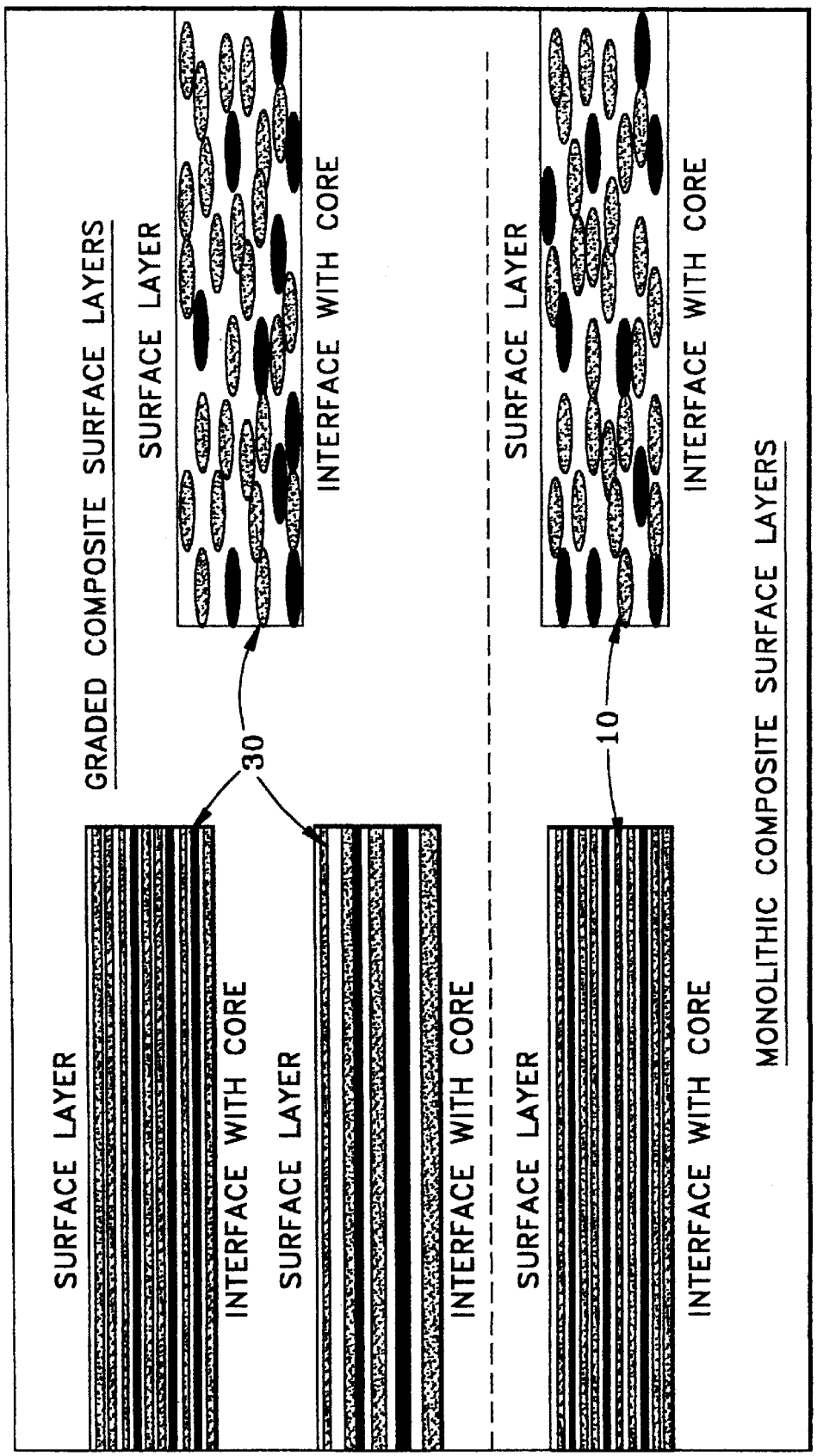
FIG. 3 are exemplary monolithic and graded surface layer configurations, as embodied by the invention.

FIG. 3 illustrates exemplary monolithic and graded surface layer configurations, as embodied by the invention. FIG. 3 sets forth a three-phase structure that includes a ductile metallic phase (dark regions), a Laves-phase (grey regions) that provides enhanced oxidation resistance, and a silicide phase (white regions) that provides enhanced strength and oxidation resistance. A monolithic RMIC can comprise a lamellar phase distribution and a discrete particulate phase distribution. In each of these distributions, an average phase fraction with a surface layer is essentially equal.

For a graded RMIC, the surface layer may comprise lamellar and discrete particulate phase distributions. In the discrete distribution, an amount of the ductile metallic phase (dark phase) is greatest proximate the core and the amount of Laves-phase (grey) is greatest near the outer surface of the surface layer. In the discrete distribution, the gradient of phase distribution can be exponential or linear, or any other suitable distribution.

The lamellar distributions are suitable for applications for layers with similar thicknesses in which the amount of ductile metallic phase decreases from core to surface of the layer, and applications with structures with varying lamellar thicknesses, with also exhibit a decrease in ductile metallic phase from core to surface. Further, alternative RMIC graded distribution include, but not limited to, multiple zones of lamellar layers, as discussed herein. These distributions are merely exemplary and are not intended to limit the invention in any manner.

A series of RMIC compositions were prepared, tested, and evaluated to investigate RMIC characteristics, including oxidation resistance. An exemplary description of the process for preparing RMIC materials and structures, along with the testing and evaluating process will now be provided, with values being approximate unless otherwise specified. RMIC materials, as embodied by the invention, were prepared by arc casting tapered disks that were about 0.8" thick and provided with a 2.5"–3" tapered diameter. Pins of 0.12" diameter by about 1.25" in length were prepared by electro-discharge machining (EDM) and centerless grinding. These pins were then subjected to 100 hours air exposure heat treatment (100 hours hot time with a total test exposure of 117 hours) in one-hour cycles. Cooling to room temperature occurred after each hour of heat treatment at temperatures of 1800° F. (7980° C.), 2000° F. (1095° C.), 2200° F. (1205° C.), or 2400° F. (1315° C.). Samples were weighed before, periodically during, and after the test to determine an average weight change per unit area as a function of exposure time. The samples were then cut at a mid-section and prepared metallographically for evaluation of a change in diameter and in microstructure. Results of the weight change and diameter change are set forth in Table II, as a function of RMIC (alloy) chemistry, at completion of the testing.

TABLE II

Cyclic oxidation results for Arc Cast RMICs

| Alloy | ratio | Nb | Ti | Hf | Si | Al | Cr | B | Ta | Ge | Mo | W | Sn | Fe | 1800° Change in wt | 1800° Change in size (mil) | 2000° Change in wt | 2000° Change in size (mil) | 2200° Change in wt | 2200° Change in size (mil) | 2400° Change in wt | 2400° Hrs. | 2400° Change in size (mil) |
|---|---|---|---|---|---|---|---|---|---|---|---|---|---|---|---|---|---|---|---|---|---|---|---|
| Aa | 1.5 | 41 | 23 | 4 | 17 | 2 | 13 | | | | | | | | −193 | −12 | −255 | −4 | −216 | −3 | −455 | 73 | −39 |
| Ab | 1.5 | 38.5 | 21.5 | 4 | 17 | 2 | 13 | 4 | | | | | | | −55 | −5 | −25 | −2.5 | −48 | −3.5 | −284 | 100 | −16 |
| Ac | 1.5 | 35 | 23 | 4 | 17 | 2 | 13 | | 6 | | | | | | −361 | −21 | −147 | 0 | −143 | −3 | −360 | 31 | −22 |
| Ad | 1.5 | 41 | 23 | 4 | 12 | 2 | 13 | | | | | | | | −28 | −3 | 7 | 0 | −38 | −4 | −321 | 100 | −28 |
| Ae | 1.5 | 40.5 | 22.5 | 4 | 17 | 2 | 13 | | | 5 | | | | | −61 | −4 | −132 | −7 | −222 | −13.5 | −405 | 52 | Xx |
| Af | 1.5 | 40.5 | 22.5 | 4 | 17 | 2 | 13 | | | | 1 | | | | −201 | −3 | −207 | −9 | −105 | −3 | −423 | 73 | −35 |
| Ag | 1.5 | 40 | 22.5 | 4 | 17 | 2 | 13 | | | | | 1 | | | −151 | −7 | −439 | −32 | −88 | −2.5 | −350 | 73 | −22 |
| Ah | 1.5 | 40 | 22.5 | 4 | 17 | 2 | 13 | | | | | | 1.5 | | No test | | | | −37 | −2 | −441 | 73 | −31 |
| Ai | 1.5 | 42.5 | 23.5 | 4 | 17 | | 13 | | | | | | | 2 | −95 | −6 | −153 | −6.5 | −129 | −6 | −495 | 73 | −38 |
| Aj | 1.5 | 42.5 | 25.5 | 2 | 17 | 2 | 13 | | | | | | | | −260 | −17 | −161 | −5 | −111 | −6 | −489 | 73 | −52 |
| Ak | 2.5 | 48.5 | 15.5 | 4 | 17 | 2 | 13 | | | | | | | | dust | −60 | dust | −60 | −420 | −28 | −470 | 31 | −37 |
| Al | 2.5 | 46 | 14 | 4 | 17 | 2 | 13 | 4 | | | | | | | −372 | −60 | −210 | −13 | −302 | −23.5 | −322 | 31 | −26 |
| Am | 2.5 | 42.5 | 15.5 | 4 | 12 | 2 | 13 | | 6 | | | | | | xx | xx | xx | xx | No test | | xx | xx | Xx |
| An | 2.5 | 48.5 | 15.5 | 4 | 17 | 2 | 13 | | | 5 | | | | | −39 | −3 | −22 | −2 | −148 | −13.5 | −460 | 73 | −30 |
| Ao | 2.5 | 48 | 15 | 4 | 17 | 2 | 13 | | | | 1 | | | | −475 | −40 | No test | | (−492) | −60 | −393 | 31 | −31 |
| Ap | 2.5 | 48 | 15 | 4 | 17 | 2 | 13 | | | | | 1 | | | dust | −60 | dust | −60 | −482 | −37 | −387 | 31 | −25 |
| Aq | 2.5 | 47.5 | 15 | 4 | 17 | 2 | 13 | | | | | | 1.5 | | −381 | −27 | dust | −60 | (−484) | −60 | −482 | 73 | −40 |
| Ar | 2.5 | 47.5 | 15 | 4 | 17 | 2 | 13 | | | | | | | | dust | −60 | dust | −22 | −275 | −16 | −397 | 31 | −32 |
| As | 2.5 | 50 | 16 | 2 | 17 | | 13 | | | | | | | | dust | −60 | dust | −60 | (−433) | −60 | −518 | 31 | −36 |
| At | 2.5 | 50 | 18 | 2 | 17 | | 13 | | | | | | | | dust | −60 | dust | −60 | −347 | −14.5 | −445 | 31 | −33 |
| Au | 1.5 | 32.5 | 23 | 2 | 17 | 2 | 13 | | | | 1 | | | 2 | −35 | −3 | −20 | −3 | −102 | −5.5 | −222 | 100 | −14 |
| Av | 1.5 | 29.5 | 21 | 2 | 17 | 2 | 13 | | 6 | | | | 1.5 | | 7 | −5 | 10 | 0 | −17 | −1 | −175 | 100 | Xx |
| Aw | 1.5 | 40.5 | 22.5 | 4 | 17 | | 13 | | 6 | 5 | | | 1.5 | | −189 | −11 | −195 | −20 | −114 | −7 | −498 | 73 | −50 |
| Ax | 1.5 | 40.5 | 22.5 | 2 | 20 | | 13 | | | | | | | | −17 | −.5 | 10 | 0 | 17 | −0.5 | −334 | 73 | −12 |
| Ay | 1.5 | 39 | 24 | 2 | 15 | 2 | 10 | | | 5 | | | | 3 | 9 | −1 | 14 | −1 | | | | | |
| Az | 2.0 | 43.3 | 19.7 | 2 | 15 | 2 | 10 | | | 5 | | | | 3 | −12 | −1 | 18 | −4 | | | | | |

(Nb+Ta):(Ti+Hf) concentration ratio values less than about 1.5 are desirable to provide adequate turbine component oxidation resistance. The evaluation of the results indicates that Alloys Ab, Ad, Ah, Au, Av, and Ax–Az exhibit small diameter changes at the listed evaluation temperatures. The diameter changes were less than or equal to about 5.5 mils, or about 140 microns, for evaluations at about 100 hours, at temperatures in a range from about 1800° F. to about 2200° F. The diameter changes were less than or equal to about 32 mils, or about 810 microns, for evaluations at about 100 hours, at a temperature of about 2400° F. Further, it was determined that at temperatures of about 1400° F. and about 1600° F., Ti enhances resistance to pesting in a RMIC, as embodied by the invention. Further, it was determined that Sn and Ge also improved pesting resistance in the RMIC, as embodied by the invention.

While various embodiments are described herein, it will be appreciated from the specification that various combinations of elements, variations or improvements therein may be made by those skilled in the art, and are within the scope of the invention.

We claim:

1. A refractory metal intermetallic composition comprising, in atomic percent, titanium (Ti) in a range from about 17% to about 23%, hafnium (Hf) in a range from about 1.2% to about 3%, silicon (Si) in a range from about 16% to about 18%, 2% aluminum (Al), chromiun (Cr) in a range from about 6% to about 10%, germanium (Ge) in a range from about 2% to about 4%, 2% tin (Sn), iron (Fe) in a range from about 2% to about 4%, and a balance of niobium (Nb).

2. A refractory metal intermetallic composition according to claim 1, wherein the refractory metal intermetallic composition further comprises at least one of boron (B), tantalum (Ta), and tungsten (W).

3. A refractory metal intermetallic composition according to claim 2, wherein a concentration ratio value for (Nb+Ta):(Ti+Hf) is in a range from about 1.4 to about 2.25.

4. A refractory metal intermetallic composition according to claim 2, wherein a concentration ratio value for (Nb+Ta):(Ti+Hf) is about 1.4.

5. A refractory metal intermetallic composition according to claim 2, wherein a concentration ratio value for (Nb+Ta):(Ti+Hf) is about 2.25.

6. A refractory metal intermetallic composition according to claim 2, wherein the refractory metal intermetallic composition comprises, in atomic percent, 23% titanium (Ti), 1.2% hafnium (Hf), 18% silicon (Si), 2% aluminum (Al), 10% chromium (Cr), 4% germanium (Ge), 2% tin (Sn), 4% iron (Fe), 2% boron (B), and a balance of niobium (Nb).

7. A refractory metal intermetallic composition according to claim 6, wherein a concentration ratio value for (Nb+Ta):(Ti+Hf) of about 1.4.

8. A refractory metal intermetallic composition according to claim 1, wherein the refractory metal intermetallic composition comprises, in atomic percent, 17% titanium (Ti), 3% hafnium (Hf), 16% silicon (Si), 2% aluminum (Al), 6% chromium (Cr), 2% germanium (Ge), 2% tin (Sn), 2% iron (Fe), and a balance of niobium (Nb).

9. A refractory metal intermetallic composition according to claim 6, wherein the refractory metal intermetallic composition comprises, in atomic percent, 5% tantalum (Ta) and 3% tungsten (W).

10. A refractory metal intermetallic composition according to claim 6, wherein a concentration ratio value for (Nb+Ta):(Ti+Hf) is about 2.25.

11. A refractory metal intermetallic composition according to claim 1, wherein the refractory metal intermetallic composition comprises at least one of, in atomic percent, 2% boron (B), 5% tantalum (Ta), and 3% tungsten (W).

12. A turbine component comprising a refractory metal intermetallic composition, wherein the refractory metal intermetallic composition comprises, in atomic percent, titanium (Ti) in a range from about 17% to about 23%, hafnium (Hf) in a range from about 1% to about 3%, silicon (Si) in a range from about 16% to about 18%, 2% aluminum (Al), chromium (Cr) in a range from about 6% to about 10%, germanium (Ge) in a range from about 2% to about 4%, 2% tin (Sn), iron (Fe) in a range from about 2% to about 4%, and a balance of niobium (Nb).

13. A turbine component according to claim 12, wherein the refractory metal intermetallic composition further comprises at least one of boron (B), tantalum (Ta), and tungsten (W).

14. A turbine component according to claim 13, wherein a concentration ratio value for (Nb+Ta):(Ti+Hf) is in a range from about 1.4 to about 2.25.

15. A turbine component according to claim 13, wherein a concentration ratio value for (Nb+Ta):(Ti+Hf) is about 1.4.

16. A turbine component according to claim 13, wherein a concentration ratio value for (Nb+Ta):(Ti+Hf) is about 2.25.

17. A turbine component according to claim 13, wherein the refractory metal intermetallic composition comprises in atomic percent, 23% titanium (Ti), 1.2% hafnium (Hf), 18% silicon (Si), 2% aluminum (Al), 10% chromium (Cr), 4% germanium (Ge), 2% tin (Sn), 4% iron (Fe), 2% boron (B), and a balance of niobium (Nb).

18. A turbine component according to claim 17, wherein a concentration ratio value for (Nb+Ta):(Ti+Hf) is about 1.4.

19. A turbine component according to claim 12, wherein the refractory metal intermetallic composition comprises, in atomic percent, 17% titanium (Ti), 3% hafnium (Hf), 16% silicon (Si), 2% aluminum (Al), 6% chromium (Cr), 2% germanium (Ge), 2% tin (Sn), 2% iron (Fe), and a balance of niobium (Nb).

20. A turbine component according to claim 19, wherein the refractory metal intermetallic composition further comprises, in atomic percent, 5% tantalum (Ta) and 3% tungsten (W).

21. A turbine component according to claim 20, wherein a concentration ratio value for (Nb+Ta):(Ti+Hf) of about 2.25.

22. A turbine component according to claim 12, wherein the refractory metal intermetallic composition comprises at least one of, in atomic percent, 2% boron (B), 5% tantalum (Ta), and 3% tungsten (W).

23. A turbine component according to claim 22, wherein the turbine component comprises a surface layer, wherein the turbine component surface layer comprises the refractory metal intermetallic composition comprising, in atomic percent, 23% titanium (Ti), 1.2% hafnium (Hf), 18% silicon (Si), 2% aluminum (Al), 10% chromium (Cr), 4% germanium (Ge), 2% tin (Sn), 4% iron (Fe), 2% boron (B), and a balance of niobium (Nb).

24. A turbine component according to claim 23, wherein the refractory metal intermetallic composition of the turbine component surface layer comprises concentration ratio value for (Nb+Ta):(Ti+Hf) of about 1.4.

25. A turbine component according to claim 22, wherein the turbine component comprises a core, the refractory metal intermetallic composition of the core comprises, in atomic percent, 17% titanium (Ti), 3% hafnium (Hf), 16% silicon (Si), 2% aluminum (Al), 6% chromium (Cr), 2% germanium (Ge), 2% tin (Sn), 2% iron (Fe), 5% tantalum (Ta) and 3% tungsten (W), and a balance of niobium (Nb).

26. A turbine component according to claim 25, wherein the refractory metal intermetallic composition of the turbine component core comprises concentration ratio value for (Nb+Ta):(Ti+Hf) is about 2.25.

27. A turbine component according to claim 22, wherein the turbine component comprises a core and a surface layer coating, the turbine component surface layer comprises the refractory metal intermetallic composition comprising, in atomic percent, 23% titanium (Ti), 1.2% hafnium (Hf), 18% silicon (Si), 2% aluminum (Al), 10% chromium (Cr), 4% germanium (Ge), 2% tin (Sn), 4% iron (Fe), 2% boron (B), and a balance of niobium (Nb) and the refractory metal intermetallic composition of the core comprises, in atomic percent, 17% titanium (Ti), 3% hafnium (if), 16% silicon (Si), 2% aluminum (Al), 6% chromium (Cr), 2% germanium (Ge), 2% tin (Sn), 2% iron (Fe), 5% tantalum (Ta) and 3% tungsten (W), and a balance of niobium (Nb).

28. A turbine component according to claim 27, wherein the surface layer coating comprises a monolithic refractory metal intermetallic composition chemistry across the surface layer.

29. A turbine component according to claim 27, wherein the surface layer coating comprises a graded refractory metal intermetallic composition chemistry across the surface layer.

30. A multi-piece turbine component comprising a core and a surface layer, the turbine component surface layer comprising a refractory metal intermetallic composition, the surface layer refractory metal intermetallic composition comprising, in atomic percent, 23% titanium (Ti), 1.2% hafnium (Hf), 18% silicon (Si), 2% aluminum (Al), 10% chromium (Cr), 4% germanium (Ge), 2% tin (Sn), 4% iron (Fe), 2% boron (B), and a balance of niobium (Nb), the turbine component core comprising a refractory metal intermetallic composition that comprises, in atomic percent, 17% titanium (Ti), 3% hafnium (Hf), 16% silicon (Si), 2% aluminum (Al), 6% chromium (Cr), 2% germanium (Ge), 2% tin (Sn), 2% iron (Fe), 5% tantalum (Ta) and 3% tungsten (W), and a balance of niobium (Nb).

31. A turbine component according to, claim 30, wherein a concentration ratio value for (Nb+Ta):(Ti+Hf) in a range from about 1.4 to about 2.25.

32. A refractory metal intermetallic composite according to claim 1, wherein the refractory metal intermetallic composition exhibits oxidation resistance and creep resistance that are sufficient for turbine component applications.

33. A turbine component according to claim 1, wherein the refractory metal intermetallic composition exhibits oxidation resistance and creep resistance.

34. A turbine component according to claim 30, wherein the refractory metal intermetallic composition exhibits oxidation resistance and creep resistance.

* * * * *